United States Patent

Field

[11] Patent Number: 5,850,699
[45] Date of Patent: Dec. 22, 1998

[54] SEVERING OR CUTTING TOOL

[76] Inventor: Stephen John Field, 193 Dennis Rd., Cedar Vale, Australia, QLD 4285

[21] Appl. No.: 711,596

[22] Filed: Sep. 10, 1996

[51] Int. Cl.⁶ .................................................. B27B 21/06
[52] U.S. Cl. ................................................ 30/513
[58] Field of Search .......................... 30/507, 509, 510, 30/513, 514, 517, 520

[56] References Cited

U.S. PATENT DOCUMENTS

| | | | |
|---|---|---|---|
| 653,947 | 7/1900 | Condon | 30/513 |
| 712,452 | 10/1902 | Chambers | 30/520 |
| 2,308,354 | 1/1943 | Clemson | 30/513 |
| 2,320,511 | 6/1943 | Curry | 30/513 |
| 2,531,135 | 11/1950 | Kulp | 30/513 |
| 2,616,465 | 11/1952 | Lindenau | 30/510 |
| 3,173,461 | 3/1965 | Johnson | 30/510 |

FOREIGN PATENT DOCUMENTS 2302971  7/1974  Germany .

*Primary Examiner*—Hwei-Siu Payer
*Attorney, Agent, or Firm*—Shoemaker and Mattare, Ltd.

[57] ABSTRACT

A tool which in one aspect is applicable as severing or cutting apparatus including a coupling member for engagement with an elongated extension member such as a swimming pool pole and a blade support frame mounted to the coupling member for movement relative thereto, and a cutting blade mounted at one end the frame and at its other end to the coupling member. Means are provided for adjusting the position of the frame relative to the coupling member for tensioning the cutting blade. In a further form, the coupling member is provided in an adaptor and a separate mounting part is provided for mounting of the blade and blade support frame, the adaptor and mounting part being releasably connected. When disconnected, the adaptor may engage with other forms of implement again for use with an elongated extension member.

4 Claims, 3 Drawing Sheets

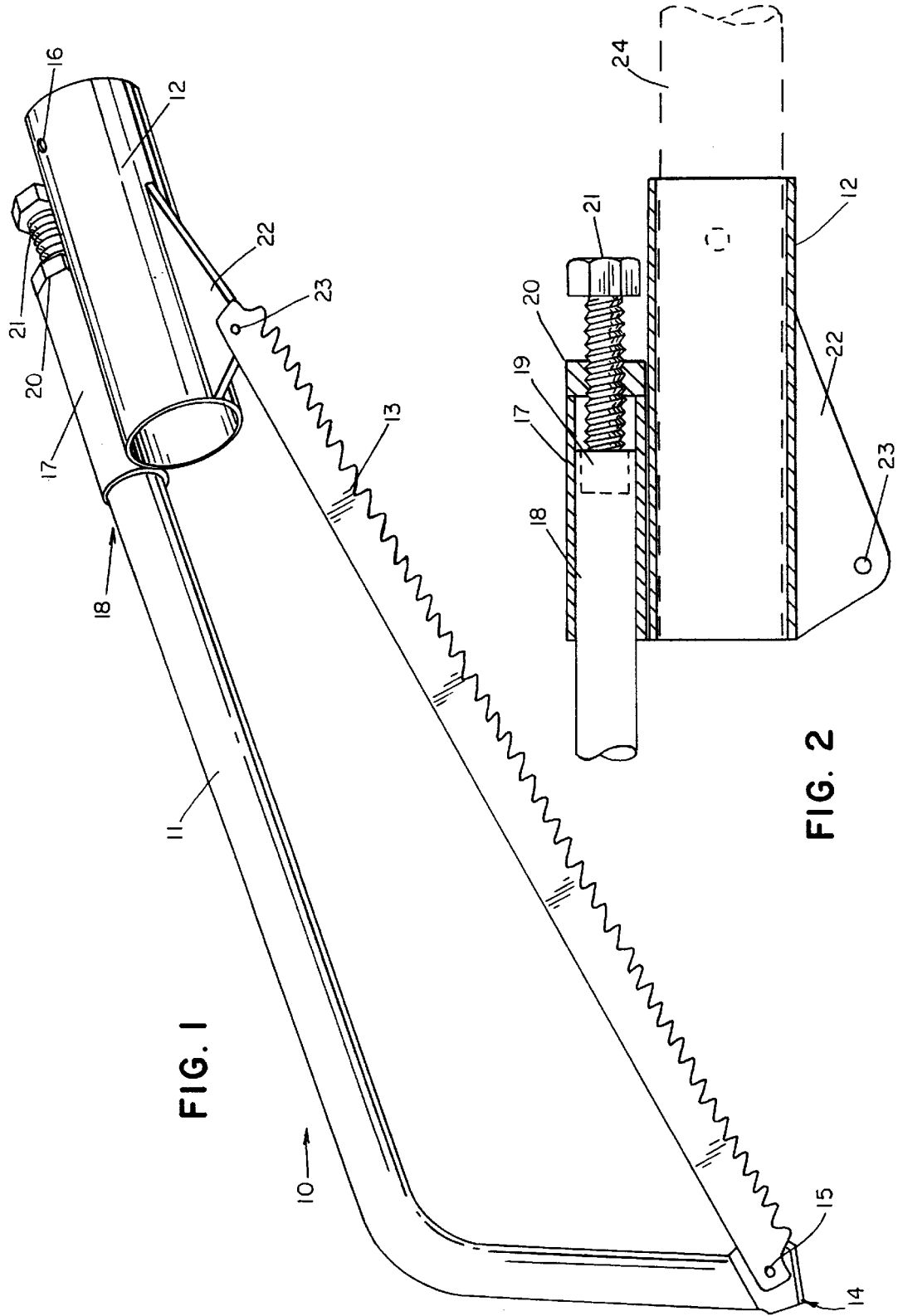

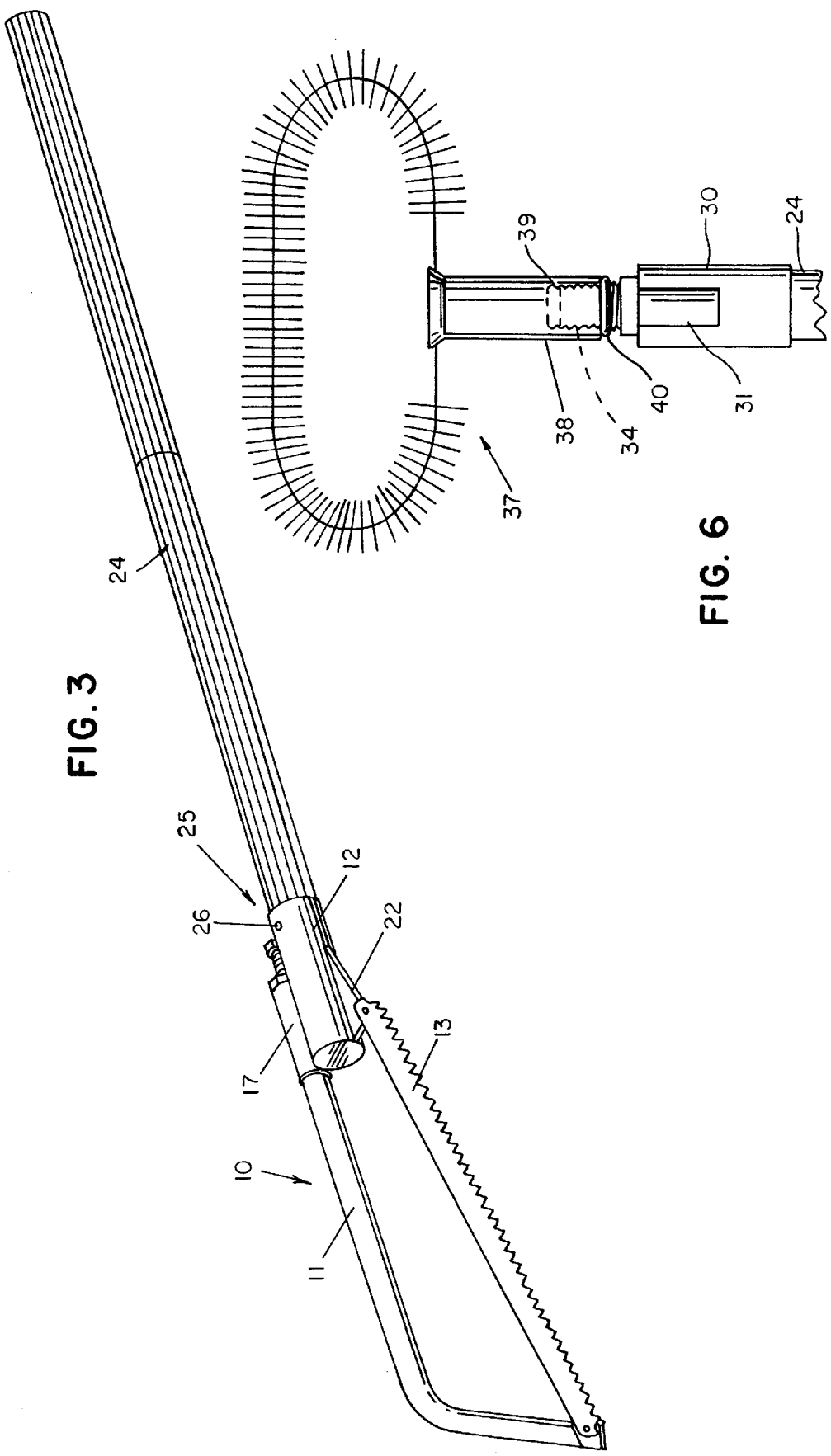

5,850,699

SEVERING OR CUTTING TOOL

TECHNICAL FIELD

This invention relates to a tool which in one aspect is in the form of severing or cutting apparatus designed for use with a hand held elongated extension member such as poles as used with swimming pool brushes, vacuum heads or leaf scoops for pruning or trimming vegetation at an elevated location. The present invention in a further aspect relates to an adaptor for adapting hand held elongated extension members of the above type for connection to severing or cutting apparatus or other apparatus.

BACKGROUND ART

Pruning of vegetation is undertaken by a number of different tools including hand shears and bow saws. In many circumstances, however, difficulties are encountered due to access problems. For example, vegetation to be pruned may be too high to reach such as in the case of palm fronds. Alternatively the vegetation may be obstructed by sharp thorns or other physical obstructions. Similar problems are encountered when it is required to use other tools at an elevated location.

The present invention aims to overcome or alleviate the above disadvantages by providing a tool which in one aspect may serve as severing or cutting apparatus particularly suited to pruning or trimming vegetation in areas where access is difficult. The present invention aims in a further aspect to provide an adaptor for adapting elongated extension members for connection to severing or cutting apparatus or other apparatus required to be used at an elevated attitude. Other objects and advantages of the invention will become apparent from the following description.

SUMMARY OF THE INVENTION

The present invention thus provides in one aspect a tool for use with a hand graspable elongated extension member, said apparatus including coupling means for coupling said tool to said extension member, a blade support frame mounted to said coupling means for movement relative thereto, a cutting blade, means for mounting one end of said blade to said frame, means for mounting the other end of said blade to said coupling means, and means for adjusting the position of said frame relative to said coupling means for tensioning said cutting blade.

The tool for the invention is most suitably designed for use with an extension member or pole of the type which is used with swimming pool equipment, for example for connection to a leaf scoop or a vacuum head. Most commonly such poles are telescopic. An extension pole of this type is normally provided with a spring clip at one end by which the pole can engage with various swimming pool cleaning components. The spring clip as incorporated in such an extension pole is adapted to couple the extension pole to the apparatus of the invention. For this purpose the coupling means may comprise a tubular socket to receive an end of the pole, the socket having one or more apertures to receive a spring loaded button of the spring clip to positively retain the apparatus to the pole.

For mounting of the frame of the cutting blade, the coupling means may carry a slide or socket in which one end of the frame locates for sliding movement and the blade is coupled between the other end of the frame and the coupling means. Means may be provided for selectively moving the frame along the slide or socket to apply tension to the blade.

The means for adjusting the position of the frame and therefore the tension in the blade may comprise a threaded member such as a screw which may abut against one end of the frame to urge the frame along the slide or socket.

The blade is preferably mounted to the coupling means through a bracing member. The frame may be any suitable size or configuration depending upon the size of the blade and the nature of the vegetation to be pruned or trimmed.

The components of the tool apart from the blade may be made from any metals, alloys, plastics or glass reinforced fibre materials. The blade most preferably is in the form of a metal saw blade provided with a plurality of cutting teeth which may be hardened.

In one arrangement the coupling means is in two parts comprising a first adaptor part adapted to be coupled to the extension member and a second blade mounting part releasably mounted to the first adaptor part. The blade mounting part may comprise a mounting plate which carries the socket or slide for receiving the one end of the blade frame. The mounting part may further carry the bracing member to which the blade may be coupled.

The first adaptor part may include the socket for coupling to the extension member. The first adaptor part further includes a threaded spigot which for connection of the blade is arranged to extend through an aperture in the mounting plate of the blade mounting part to be clamped thereto by a nut. The spigot includes for this purpose, a first threaded portion adapted to receive the nut. The spigot may further include a second portion extending beyond the first portion and carrying a universal thread to enable the spigot and thus the extension member to be coupled to other apparatus such as brushes or paint rollers which have a handle with an internally threaded end for coupling to the universal thread.

BRIEF DESCRIPTION OF THE DRAWINGS

In order that the invention may be more readily understood and put into practical effect, reference will now be made to the accompanying drawings which illustrate a preferred embodiment of the invention and wherein :

FIG. 1 illustrates a first form of severing or cutting apparatus according to the present invention;

FIG. 2 is a sectional view of the coupling end of the apparatus of FIG. 1;

FIG. 3 illustrates the apparatus of the invention coupled to a telescopic swimming pool pole;

FIG. 6 illustrates a typical alternative use of part of the coupling means of the embodiment of FIG. 5.

DETAILED DESCRIPTION OF THE EMBODIMENTS

Figure 4:
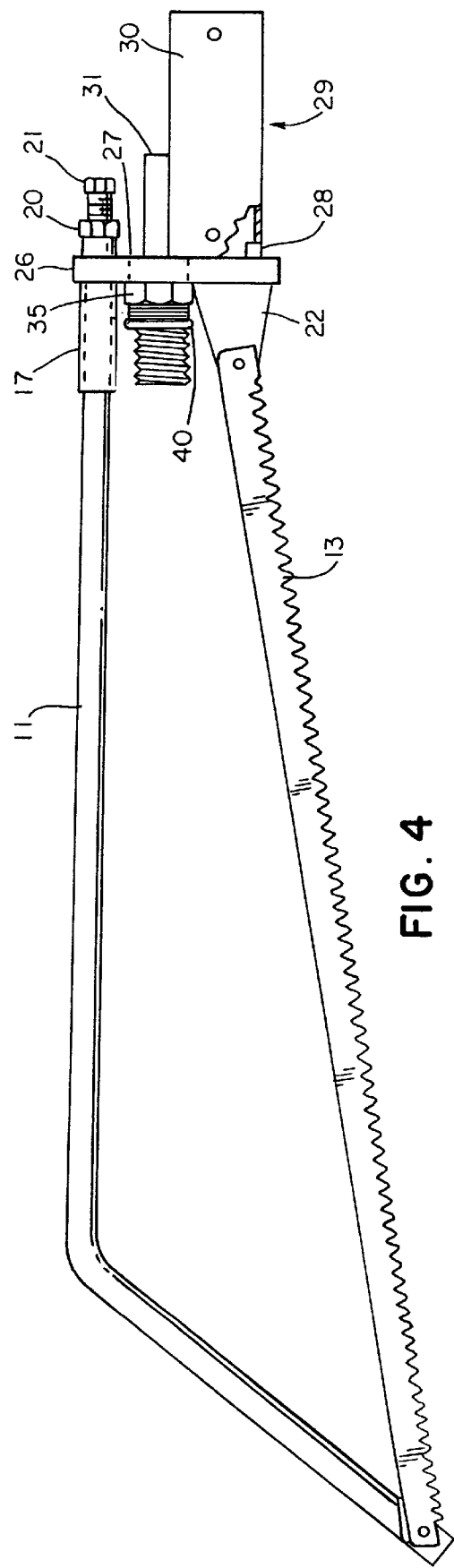
FIG. 4 illustrates in elevational view a second form of severing or cutting apparatus according to the invention.
Figure 5:
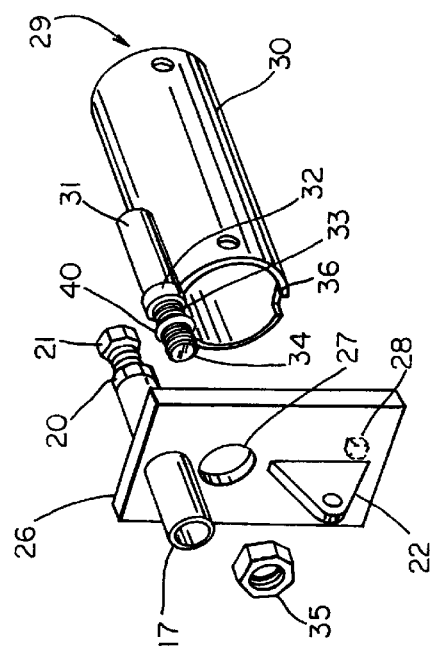
FIG. 5 illustrates in exploded view the components of the coupling means of the embodiment of FIG. 4.

Referring to the drawings and firstly to FIGS. 1 and 2 there is illustrated a severing or cutting apparatus 10 according to a first form of the present invention including a blade support frame 11, a coupling member 12 of generally hollow tubular form and a blade 13 which extends between the coupling member 12 and free end 14 of the frame 11. The frame 11 in this embodiment comprises a length of tubular steel which is bent to the required configuration to suit the application and the size of the blade being used. The free end 14 of the frame 11 is flattened and provided with a pin 15 for location in an aperture in one end of the blade 13. The coupling member 12 includes one or more apertures 16 through its side wall to enable acceptance of the spring loaded pin of a spring clip at the end of an elongated extension member such as a swimming pool accessories pole. Alternatively the coupling member 12 may be coupled to an extension member by means of a bolt or other fastener passed through the aperture 16 and a corresponding aperture in the end of the pole.

Secured to the coupling member 12 and extending parallel thereto is a tubular socket or slide 17 which is adapted to receive the end 18 of the frame 11, the socket or slide 17 having an internal diameter such as to enable it to slidably receive the end 18 of the frame 11. The end 18 of the frame 11 is blocked or closed by a plug 19 for a purpose which will hereinafter become apparent. At the end of the socket 17, a nut 20 is provided and secured to the end of the socket 17 such as by welding. A tensioning screw 21 is screw engaged with the nut 20 to apply a tension to the blade as described further below.

The opposite side of the coupling member 12 is providing with a bracing member 22 for supporting the blade 13. The bracing member 22 for this purpose may be provided with a protruding pin 23 over which an aperture in an end of the blade 13 may locate. The blade 13 of course may be secured to the frame end 14 and bracing member 22 by other means such as nuts and bolts. When the blade 13 is positioned between the end 14 of the frame 11 and brace 22, the screw 21 may be tightened to abut against the end plug 19 of the frame 11 and cause the end 18 of the frame 11 to move outwardly along the socket 17. This thereby applies a tension to the blade 13 between the end 14 of the frame 11 and brace 22. Loosening of the screw 21 allows the frame end 18 to be moved further into the socket 17 and thereby release tension on the blade 13 and allow for detachment thereof.

In use and as shown in FIG. 3 an elongated extension member 24 which may comprise a swimming pool pole may be engaged with the apparatus 10 by inserting the clip end thereof into the coupling member 12 to enable engagement therewith. The spring loaded button 26 on the end of the member 24 will snap into the aperture 16 to retain the apparatus 10 to the member 24. The extension member 24 is grasped by hand and the extended length thereof permits the severing or cutting apparatus 10 to be located at positions not normally accessible for example at high branches of trees to enable those branches to be cut and severed by the blade 13 using a sawing action. At the end of the procedure the extension member 24 may be simply detached from the apparatus 10 by pressing the button 26 to free it from the aperture 16 and to enable the member 24 to be removed from the coupling member 12.

Whilst in the embodiment illustrated the components of the apparatus 10 are fabricated, they may, where appropriate be formed by one moulded piece. For example the socket 17 and coupling member 12 of the embodiment of FIG. 1 may be moulded in one piece.

Referring now to FIG. 4 there is illustrated an alternative embodiment of the invention in which like components to the embodiment of FIGS. 1 to 3 have been given like numerals. In this case the components of the saw including the frame 11 and blade 13 are of the same form as that of FIG. 1. The frame 11 and blade 13 are mounted to a mounting assembly 25 comprising a mounting plate 126 supporting the socket 17, adjustment bolt 21 and nut 20 and bracing member 22'. The end 18 of the frame 11 is received in the socket 17 and the blade 13 is mounted between the outer or free end of the frame 11 and bracing member 22' such that tightening of the bolt 21 urges the frame 11 outwardly of the socket 17 to apply tension to the blade 13 as before.

The mounting plate 26 is further provided with a through aperture 27 between the bracing member 22' and socket 17 and a rearwardly directed key or lug 28 for a purpose which will hereinafter become apparent.

An adaptor 29 is provided for coupling the mounting assembly 25 carrying the saw components to an extension member such as the swimming pool pole 24. The adaptor 29 includes a socket 30 of similar form to the socket 12 of FIG. 1 for receipt of an end of the pole 24 and a longitudinally extending spigot 31 which is secured to one side of the socket 30 for example by welding and which extends forwardly thereof. The spigot 31 includes a first unthreaded portion 32, a second threaded portion 33 and a third threaded portion 34. The unthreaded portion 32 has an external diameter slightly less than the internal diameter of the aperture 27 so as to be neatly receivable therein and a length slightly less than the thickness of the plate 26.

For mounting of the mounting assembly 25, the spigot 31 is inserted into the aperture 27 and a nut 35 engaged with the threaded portion 33. When tightened, the mounting plate 26 will be urged into firm engagement with the end of the socket 30 to be held securely thereto. In this position, the key 28 is received in a slot 36 in the wall of the socket 30. This prevents the mounting assembly 25 from rotating around the spigot 31. The saw may then be used in the same manner as that described with reference to FIGS. 1 to 3.

Where it is desired to use the adaptor 29 in combination with the extension pole 24 for other purposes, the nut 35 is loosened and removed from the threaded portion 33 to release the mounting assembly 25. The spigot 31 may then be coupled to any other implement or device such as a brush 37 having a handle 38 with an internally threaded bore 39 which may be screwed onto the threaded portion 34 of the spigot 31. The brush 37 may then be used at elevated heights through the use of pole 24. Of course, any implement with a similar coupling arrangement to the handle 38 may be coupled to the threaded portion 34 of the spigot 31. Such implements may include paint rollers, squeegees, cobweb brushes or any other tool with an internally threaded handle.

So as to ensure firm engagement of the handle 38 with the spigot 31, a resilient O-ring 40 is located about the spigot 31 at the junction of the threaded portions 33 and 34, the O-ring 40 being compressed when the threaded portion 33 is engaged with the handle 38. This will prevent ready detachment of the handle 37.

Whilst the above has been given by way of illustrative embodiment of the invention, all such modifications and variations thereto as would be apparent to persons skilled in the art are deemed to fall within the broad scope and ambit of the invention as herein defined in the appended claims.

I claim:

1. A cutting means for use with elongate hand graspable extension member, said tool comprising:

coupling means for coupling said tool to said extension member;

a blade support frame mounted to said coupling means for movement relative thereto, and a cutting blade mounted at one end to said coupling means and at its other end to said blade support frame, wherein said coupling means includes a first socket adapted to receive an end of said extension member, and a second socket for slidably receiving one end of said blade support frame, said second socket being adapted to receive a threaded adjustment screw, said screw being adapted to abut said one end of said blade support frame for slidably moving said one end of said frame in said second socket to apply tension to said cutting blade.

2. A cutting tool as defined in claim 1, wherein said coupling means can be releasably coupled to said extension member.

3. A cutting tool as defined in claim 1 wherein said coupling means includes a first adaptor for coupling said tool to said extension member and a second adaptor for supporting said blade support frame, said second adaptor being releasably connected to said first adaptor.

4. A cutting tool as defined in claim 3 wherein said first adaptor comprises said first socket and a threaded spigot and said second adaptor includes as aperture for receiving said threaded spigot for securing said first adaptor to said second adaptor by a nut secured to said threaded spigot after said threaded spigot has passed through said aperture.

* * * * *